United States Patent [19]

Bilharz et al.

[11] Patent Number: 4,618,123
[45] Date of Patent: Oct. 21, 1986

[54] VALVE SYSTEM FOR A HYDRAULICALLY CONTROLLED STARTING FRICTION CLUTCH

[75] Inventors: Manfred Bilharz, Bergheim; Peter Heider, Weilerswist; Hartmut Röper, Bochum; Martin Taal; Fritz Henken, both of Pulheim; Ernst Kohl, Cologne; Dietmar Schubert, Hennef, all of Fed. Rep. of Germany

[73] Assignee: Ford Motor Company, Dearborn, Mich.

[21] Appl. No.: 710,265

[22] Filed: Mar. 11, 1985

[30] Foreign Application Priority Data

Mar. 22, 1984 [DE] Fed. Rep. of Germany ....... 3410512

[51] Int. Cl.$^4$ ............................................. F16D 25/14
[52] U.S. Cl. ...................................... 251/28; 137/116; 137/458; 137/625.66; 192/0.076; 192/3.29
[58] Field of Search ................. 192/0.075, 0.076, 3.29, 192/3.3, 0.032, 0.034, 0.077; 137/116, 625.66, 458; 251/28

[56] References Cited

U.S. PATENT DOCUMENTS

| | | | |
|---|---|---|---|
| 3,587,619 | 6/1971 | Krechel | 137/116 |
| 4,071,125 | 1/1978 | Jameson | 192/3.3 |
| 4,083,375 | 4/1978 | Johnson | 137/489 X |
| 4,207,924 | 6/1980 | Peters | 137/625.66 |
| 4,427,099 | 1/1984 | Van Ee | 192/3.29 |
| 4,545,401 | 10/1985 | Karpis | 137/489 X |

FOREIGN PATENT DOCUMENTS

| | | |
|---|---|---|
| 2539285 | 6/1978 | Fed. Rep. of Germany . |
| 3300453 | 5/1984 | Fed. Rep. of Germany ...... 137/458 |
| 0062764 | 4/1984 | Japan ................................ 192/0.034 |

Primary Examiner—Martin P. Schwadron
Assistant Examiner—Stephen M. Hepperle
Attorney, Agent, or Firm—Donald J. Harrington; Keith L. Zerschling

[57] ABSTRACT

A valve system for a hydraulically controlled starting friction clutch for motor vehicles, a clutch pressure control valve that controls the clutch pressure as a function of the torque demand of the driver, a valve arrangement that modulates a pressure dependent upon the engine speed and that delivers it to the clutch pressure control valve, a shuttle valve 11, a throttle orifice 12 and an accumulator 13 associated with the clutch pressure control valve 1. The shuttle valve 11 comprises a valve member 15 disposed in a valve bore 14 with three control lands 16, 17 and 18 and a spring 19 that acts upon one end of the valve member 15. A pressure signal Ppitot dependent upon the speed is applied by way of lines 21 and 22 between the first control land 16 and the second control land 17 and between the second control land 17 and the third control land 18 and is supplied by way of outlets 23 and 24 and a line 10 to the clutch pressure control valve 1. A pressure signal P$_{tv}$ dependent upon the torque acts by way of lines 26 and 27 upon both ends of the valve member 15, one line 27 having a throttle orifice 12 that reduces the pressure acting upon one end of the accumulator 13, the latter comprising a piston 29 in a valve bore 28 that is acted upon by a spring 30.

2 Claims, 2 Drawing Figures

VALVE SYSTEM FOR A HYDRAULICALLY CONTROLLED STARTING FRICTION CLUTCH

GENERAL DESCRIPTION OF THE INVENTION

Our invention relates to a valve system for a hydraulically controlled starting friction clutch.

German Auslegeschrift (Published Patent Specification) No. 25 39 285 discloses a valve system for hydraulically controlled clutches, in particular for motor vehicles, in which one or more clutch pressure control valves regulate the clutch pressure as a function of the torque requirement of the driver. A valve arrangement modulates the torque-dependent pressure signal delivered to the clutch pressure control valve.

In this known valve system the valve arrangement associated with the clutch pressure control valve comprises a throttle shuttle valve and a pressure reservoir downstream thereof. The required modulation of the torque-dependent pressure signal can occur during a sudden opening of the engine throttle. The modulation occurs in such a way that a high clutch pressure corresponding to a sudden increase in the torque requirement becomes effective only after a delay. Although the pressure reservoir, like an accumulator, causes a time delay, that delay occurs only once during the opening of the throttle. It functions only during opening of the throttle, but not during a throttling back.

Since in the known system the clutch pressure is changed only with a delay but is thereafter held at a high value, sudden changes in the torque of the engine are fully transmitted to the gearing.

The object of our present invention is to improve the valve system disclosed in the German specification in such a way that the valve arrangement, which modulates the pressure signal Ppitot delivered to the clutch pressure control valve and which is dependent upon engine speed, reacts to every torque command of the driver; i.e., it becomes effective both during the opening of the throttle and during a throttling back. In addition, it causes not only a delay in the pressure increase but also a drop in the clutch pressure.

The valve arrangement associated with the clutch pressure control valve comprises a shuttle valve, a throttle orifice and an accumulator. The shuttle valve comprises a valve member disposed in a valve bore with three control lands and a spring that acts upon one end of the valve member. A pressure signal Ppitot dependent upon the engine speed is applied between the first control land and the second control land and between the second control land and the third control land. The shuttle valve supplies the pressure signal to the clutch pressure control valve.

The pressure signal Ptv, which is dependent upon the torque, is distributed through separate passages to each end of the shuttle valve, one passage comprising a throttle orifice that communicates with one end of the accumulator.

An accumulator piston is disposed in a valve bore of the accumulator and a spring acts on the piston. The pressure signal Ppitot dependent upon the engine speed acts upon the clutch pressure control valve and is modulated in such a way that during rapid changes in the position of the accelerator pedal—namely, both during the opening of the throttle and during a throttling back the shuttle valve is moved out of its position of equilibrium. Delivery of the pressure signal dependent upon the engine speed to the clutch valve, therefore, is blocked and an outlet is thereby opened in the clutch pressure control valve, as a result of which the clutch pressure is reduced.

On account of this decay in the clutch pressure, which occurs simultaneously with rapid changes in the position of the accelerator pedal, a brief release of the friction clutch is made possible—i.e., slippage occurs for a brief moment in the friction clutch. This provides a smooth transition in the level of the torque transfer from the engine to the gearing.

Because of the effect of the torque dependent pressure signal Ptv on the shuttle valve, which ends after some fraction of a second depending upon the calibration of the throttle orifice and the spring for the shuttle valve, the shuttle valve again assumes its position of equilibrium. The duct for distributing to the clutch valve the pressure Ppitot dependent upon the engine speed is opened again, and the clutch pressure increases so that the friction clutch again is securely applied.

During sudden changes in the position of the accelerator pedal, which may be necessary for initiating acceleration or deceleration procedures, the harshness in clutch engagement is avoided. Harshness otherwise would occur when the friction clutch is applied due to the direct transfer of the sudden change in the torque of the engine. In this connection, avoidance of the harshness of the torque change not only represents an improvement in terms of comfort, but it also has a beneficial effect upon the service life of the gearing, components and the driveline of the motor vehicle.

DESCRIPTION OF FIGURES OF THE DRAWINGS

The invention is described in greater detail with reference to examples illustrated in the accompanying drawings, in which.

PARTICULAR DESCRIPTION OF THE INVENTION

Figure 1:
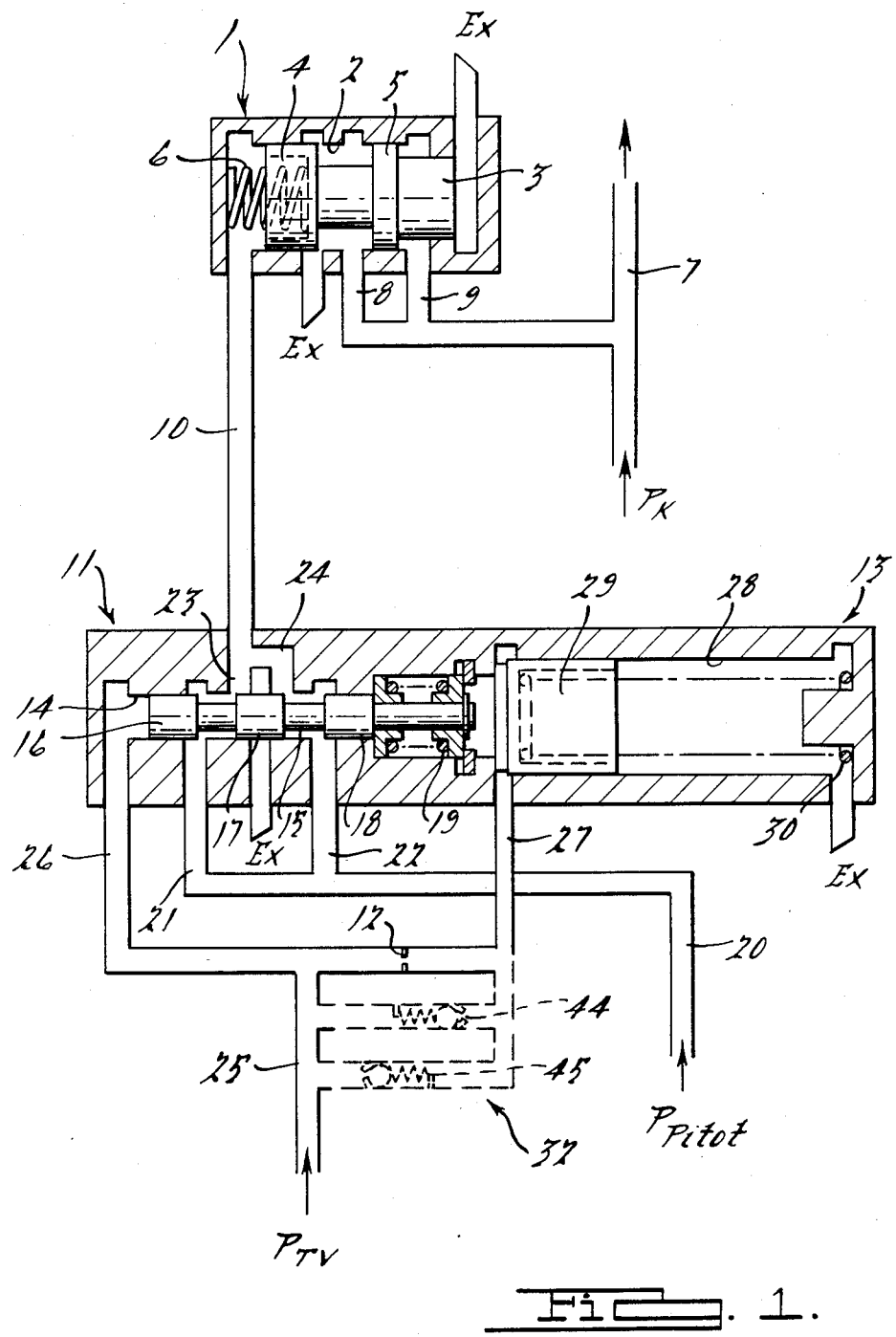
FIG. 1 is a diagrammatic layout of one embodiment of the valve system according to the invention.

A clutch pressure control valve 1 comprises a valve member 3 disposed in a valve bore 2. It has two control lands 4 and 5, one end of which is acted upon by a spring 6. The line or clutch pressure Pk is conveyed by way of a line 7 and inlets 8 and 9 to the valve bore 2 adjacent the control lands 4 and 5, while a pressure signal Ppitot, dependent upon the speed of the engine, acts by way of a line 10 upon the valve member 3 so as to assist the spring 6.

A valve arrangement according to the invention acts as a load modifying damper. It comprises a shuttle valve 11, a throttle orifice 12 and an accumulator 13 disposed upstream of clutch pressure control valve 1. The shuttle valve 11 is provided with a valve member 15 having three control lands 16, 17 and 18, which is disposed in a valve bore 14. One end of member 15 is acted upon by a spring 19. The pressure signal Ppitot dependent upon the engine speed is delivered to the valve bore 14 between the first control land 16 and the second control land 17 and between the second control land 17 and the third control land 18 by way of a line 20 and branch lines 21 and 22. A pressure signal Ptv dependent upon torque acts upon the two ends of the valve member 15 of the shuttle valve 11 by way of a line 25 and branch lines 26 and 27. The throttle orifice 12 is disposed in one branch line 27. This line 27 leads to one end of the accumulator 13, which comprises a piston 29 disposed in a valve bore 28 and which is acted upon by spring 30.

In the event of a rapid change in the position of the accelerator pedal and, therefore, in the torque-dependent pressure signal in the line 25, the throttle orifice 12 and the accumulator valve 13 cause this pressure signal to act upon the ends of the valve member 15 of the shuttle valve 11 and to build pressure forces on valve member 15 with different rates. The valve member 15 moves in the direction of the difference in valve forces. In this way further transfer of the pressure signal Ppitot dependent upon the engine speed is interrupted—i.e., this pressure signal is not further passed on to the clutch pressure control valve 1 by way of the line 10. Instead line section 10 is exhausted.

On account of this difference in pressure the clutch pressure on the right-hand side of the control land 5 creates a force that opposes the force of the spring 6 and presses the piston 3 towards the left, so that the clutch pressure Pk itself is briefly exhausted through port Ex.

On account of this reduction in the clutch pressure, which occurs simultaneously with sudden changes in the position of the accelerator pedal, slippage in the friction clutch becomes possible and this way the transfer of harsh changes in the torque from the engine to the gearing is prevented.

By a suitable design of the throttle orifice 12 and the spring 19 on the valve member 15 of the shuttle valve 11, it is possible to ensure that the unbalanced position of the valve member 15 occurs only for some tenths of a second. The valve member 15 then occupies its original position of equilibrium in which the clutch pressure again is increased and the vehicle clutch is applied fully. In this way it is ensured that slippage occurs in the friction clutch only for the brief period of time necessary for damping a sudden change in the torque of the engine. The clutch then is fully applied again immediately.

Figure 2:
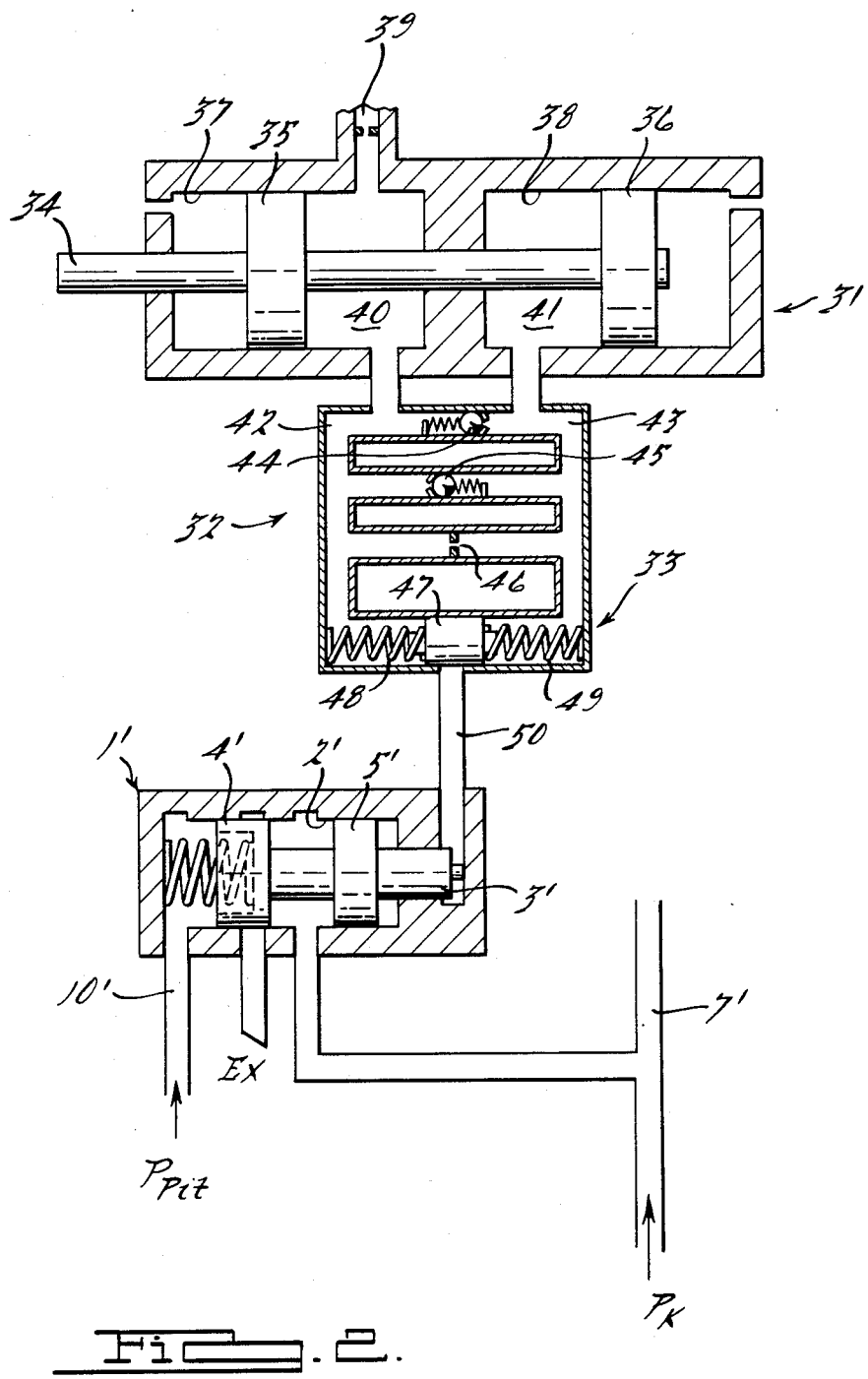
FIG. 2 is a diagrammatic layout of a further embodiment of the valve system according to the invention.

FIG. 2 shows a further embodiment of the invention in which the accumulator 13, which is necessary for the pressure neutralization required in FIG. 1, can be dispensed with. In the FIG. 2 embodiment, a direct connection to the engine throttle valve is used to actuate a shuttle valve similar to the shuttle valve 15 in FIG. 1. In this case movement of the throttle valve is transmitted mechanically to a double-piston valve 31, which acts upon a check valve and throttle orifice arrangement 32 and upon a simpler shuttle valve 33.

In this connection the shuttle valve 33 is in the form of a freely movable valve member 47 which is held by two springs 48 and 49 in a position of equilibrium where it normally blocks line 50 leading to the clutch pressure control valve 1'.

Upon rapid movement of the piston rod 34 the compensating flow caused by the increase or decrease in volume of the two chambers 40 and 41 can pass beyond the smaller throttle orifice 46 only slowly. It, therefore, will move instead the valve member 47 of the shuttle valve 33, which is normally held in equilibrium by the springs 48 and 49. Valve member 47 is shifted to the side thereof that is in communication with the expanding chamber so that a connection is briefly formed between one of the two branch ducts 42 and 43 and the duct 50 extending to the clutch pressure control valve 1'. In this way the right hand end of the valve member 3' of the clutch pressure control valve 1' is loaded opposite to the force of pressure signal Ppitot dependent upon the engine speed and acting upon the other end. Valve member 3' is displaced and the outlet Ex is uncovered, thereby effecting a slight release and slippage of the clutch at this instant during the rapid change in the position of the accelerator pedal.

Regardless of the position of the piston rod 34 and the pistons 35 and 36, the valve member 47 of the cradle valve 33 is moved by the springs 48 and 49 back to its equilibrium position to block the connection to the duct 50 since a slow volume compensation is possible by way of the reduced area throttle orifice 46.

In this connection the two inversely acting check valves 44 and 45 are arranged parallel to one another. These valves are effective in the event of very rapid and extensive accelerator pedal movements and an excessively long lingering of the shuttle valve outside its position of equilibrium occurs. That condition would result in disengagement of the clutch for a period that would be too long. The check valves 44 and 45 have the effect of controlling the displaced volume. A pressure difference greater than a given value at that time does not affect the regulation of valve 1'.

This arrangement of inversely acting excess-pressure check valves, actuated in parallel with the throttle orifice, may, as indicated by broken lines in FIG. 1, also be advantageous for the embodiment of FIG. 1.

Having thus described preferred embodiments of our invention, what we claim and desire to secure by U.S. Letters Patent is:

1. In a fluid pressure operated clutch control circuit;
   a pressure regulator valve having a pressure supply passage communicating with a fluid pressure clutch feed passage, said regulator valve having an exhaust port, a feed back pressure port and a pressure signal port, a regulator valve element and a spring acting on said valve element;
   a shuttle valve, a clutch input speed pressure signal passage communicating with said shuttle valve, an output port for said shuttle valve communicating with said pressure signal port, said shuttle valve having opposed lands and adapted to shift from one position to another to establish and interrupt communication with said clutch input speed pressure signal passage;
   an input torque pressure signal passage communicating through branch passages with said opposed lands, one branch passage having a flow restricting orifice;
   an accumulator having an expandable volume chamber communicating with the downstream side of said orifice and with the land of said shuttle valve that communicates with said one branch passage.

2. The combination as set forth in claim 1 wherein said accumulator comprises a piston and a cylinder, and spring means for urging said piston to reduce normally the expandable accumulator chamber volume.

* * * * *